April 15, 1952  H. G. HANSEN  2,592,893
SUSPENSION MEANS FOR DRIVE AXLES
Filed Dec. 26, 1947  5 Sheets-Sheet 2
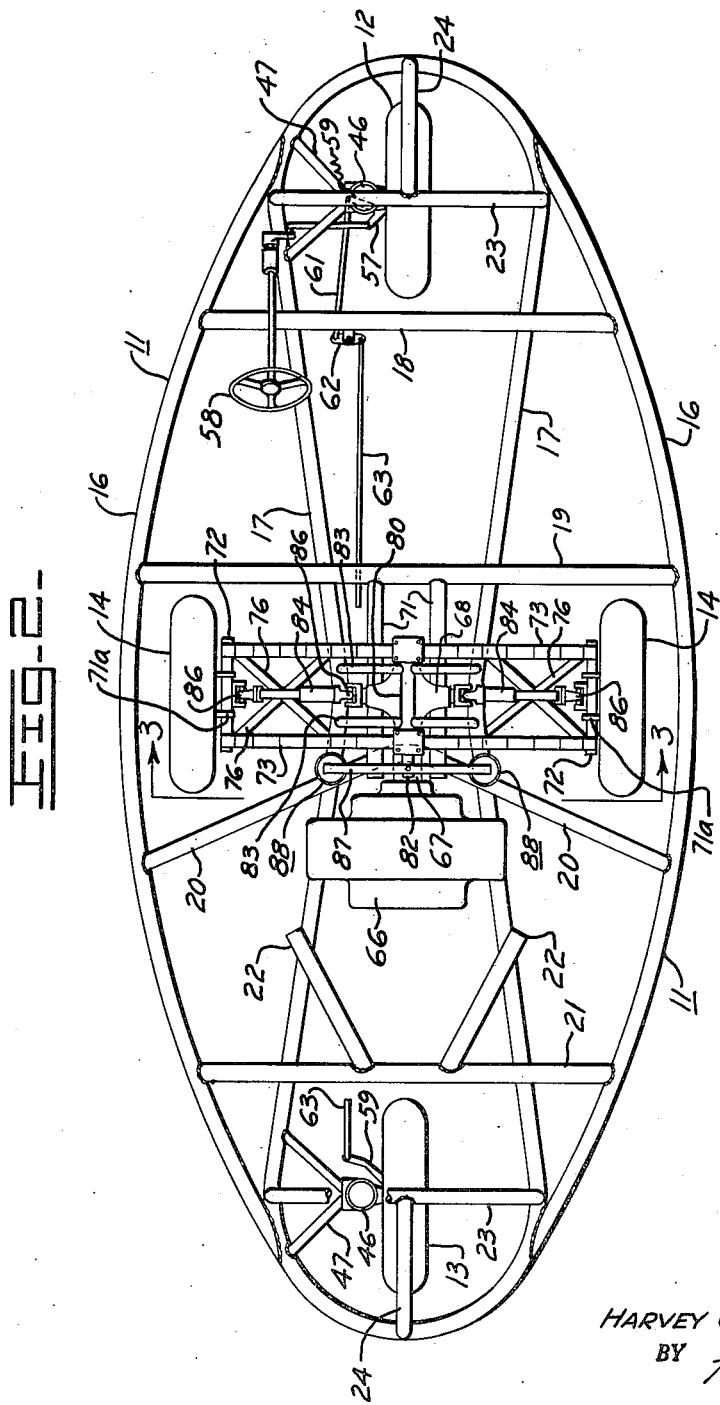
INVENTOR.
HARVEY GORDON HANSEN
BY
ATTORNEY.

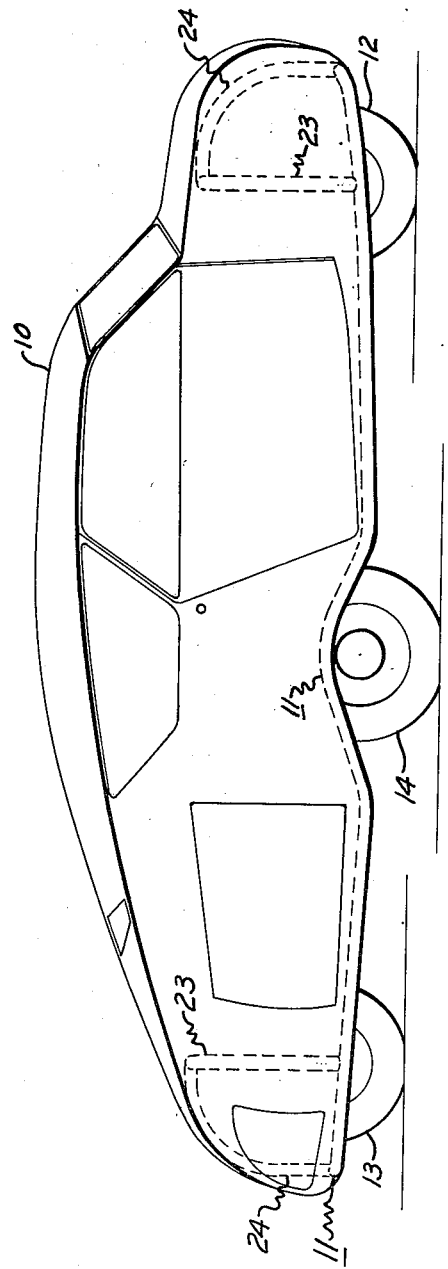

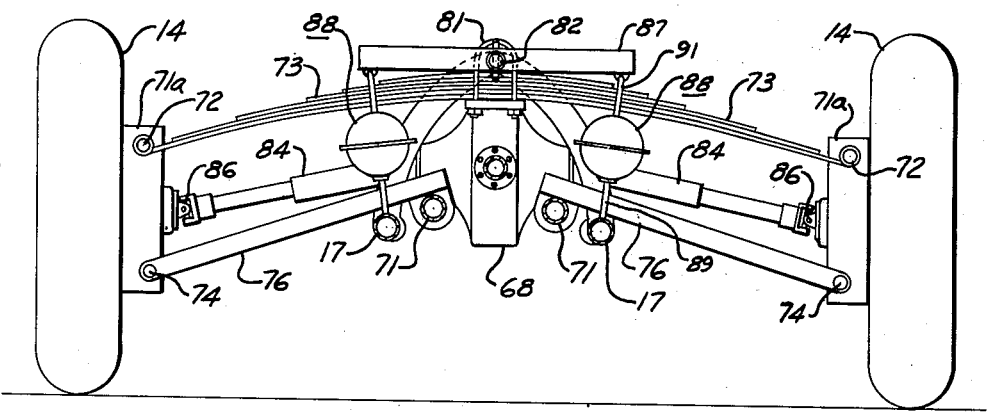
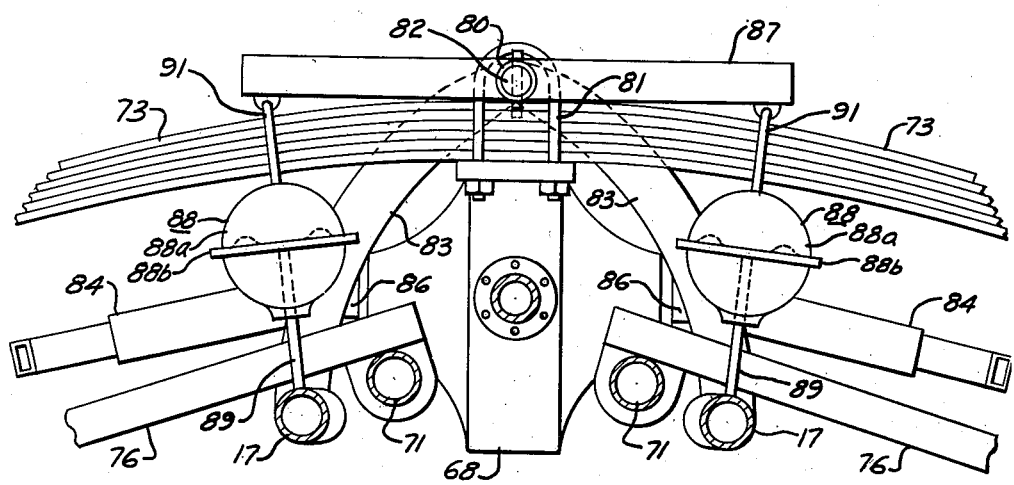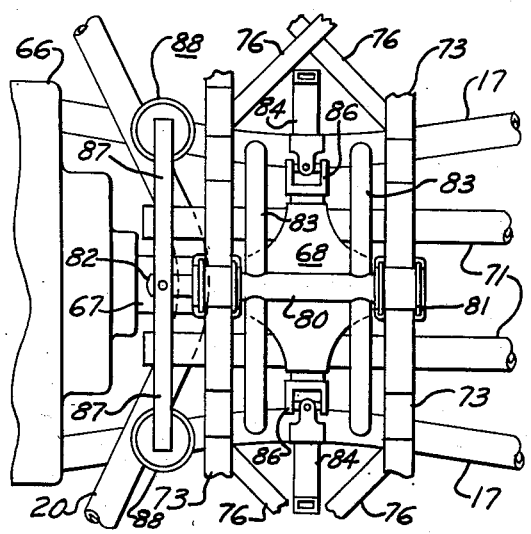

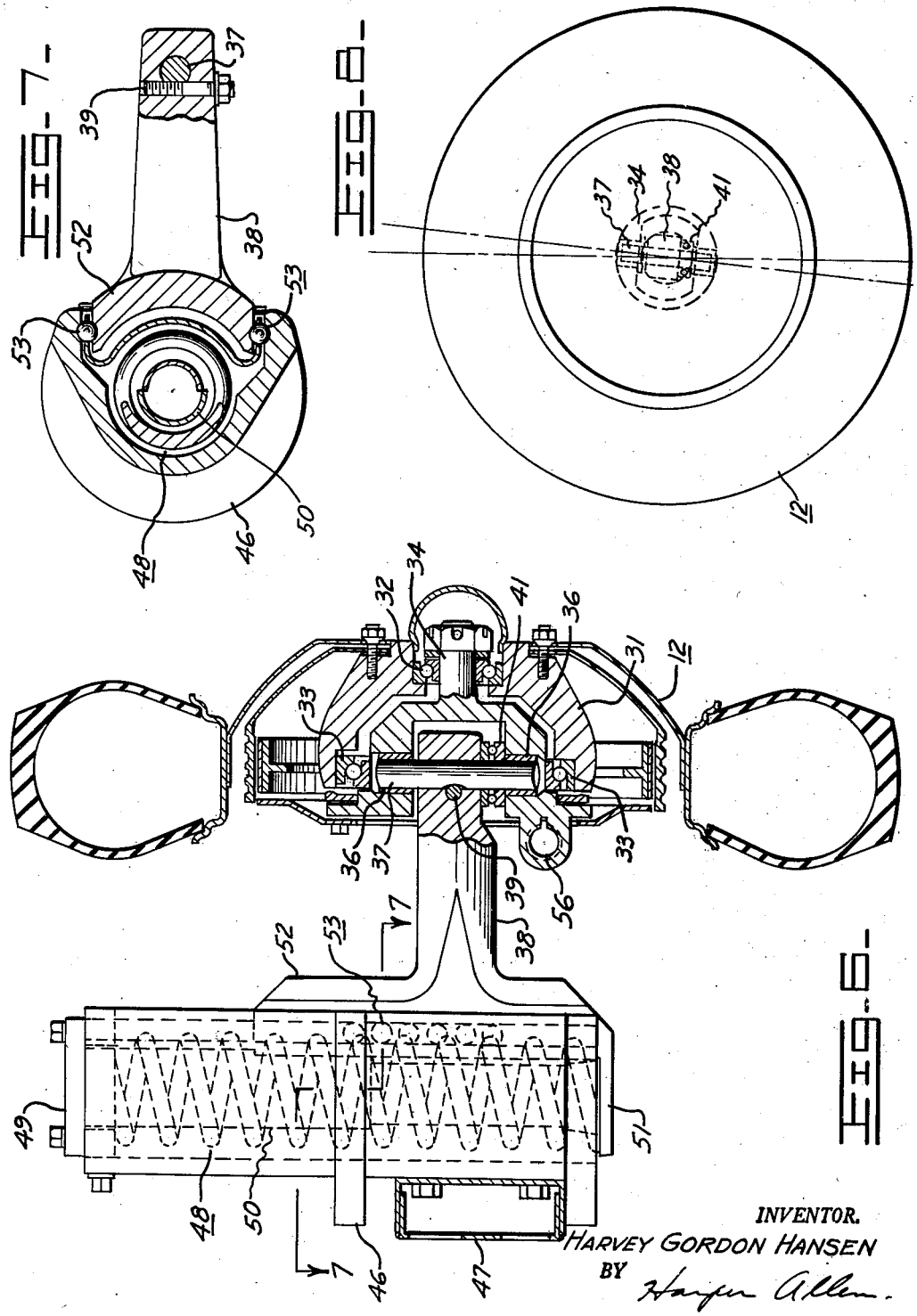

April 15, 1952 H. G. HANSEN 2,592,893
SUSPENSION MEANS FOR DRIVE AXLES
Filed Dec. 26, 1947 5 Sheets-Sheet 5
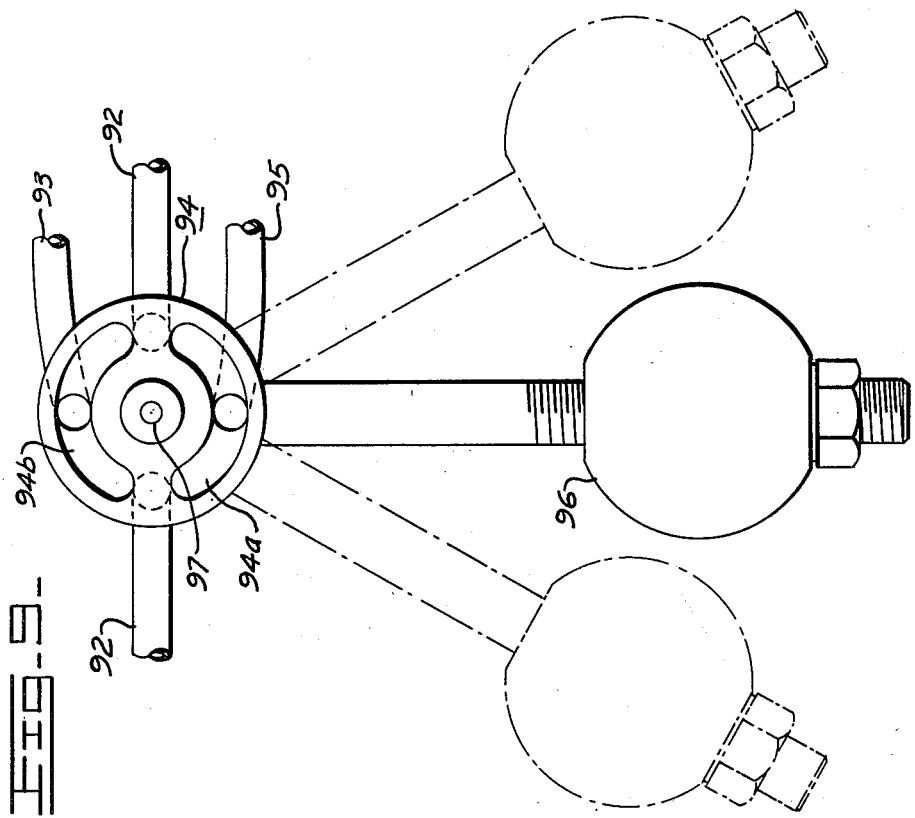
INVENTOR.
HARVEY GORDON HANSEN
BY
ATTORNEY.

Patented Apr. 15, 1952

2,592,893

UNITED STATES PATENT OFFICE 2,592,893

SUSPENSION MEANS FOR DRIVE AXLES

Harvey Gordon Hansen, San Lorenzo, Calif.

Application December 26, 1947, Serial No. 793,774

3 Claims. (Cl. 180—73)

The present invention relates to automobiles and is concerned more particularly with an automobile of the type employing a diamond shape positioning of the wheels.

In general the objects of the invention include the provision of such a diamond shape positioning of the wheels in an automobile, together with an improved construction and arrangement of the various component parts of the automobile to enhance the inherent advantages of this wheel arrangement and to contribute to easy riding, maneuverability and safety. This construction lends itself to the use of a rear engine position with a unitary drive arrangement, as well as to structural features of the body which provide for enhanced shock resistance and greater ease in handling the automobile in narrow quarters, in parking and the like.

In addition to the above general objects of the invention, the invention also is concerned with the provision of an advantageous frame construction which lends itself to shock resistance and to minimum damage from collision, as well as providing protection for both the running gear and passengers in the automobile. The invention is also concerned with a wheel arrangement and chassis suspension which provide additional advantages in easy riding qualities over both rough roads and in making turns. In particular, the suspension of the chassis is controlled so that undesirable tilting effect on turns is substantially eliminated and the comfort of the passengers is materially enhanced.

The above and other objects and advantages of the invention will be apparent from the following description of a preferred embodiment of the invention, as illustrated in the accompanying drawings, in which:

Figure 1 is a perspective side elevational view of an automobile embodying the invention.

Figure 2 is a plan view of the chassis and wheel arrangement of the automobile.

Figure 3 is a sectional elevational view of the drive wheel arrangement taken as indicated by the line 3—3 in Figure 2.

Figure 4 is an enlarged view of the center portion of Figure 3.

Figure 5 is a plan view of the arrangement shown in Figure 4.

Figure 6 is a sectional elevational view through one of the steering wheels.

Figure 7 is a sectional view taken as indicated by the line 7—7 in Figure 6.

Figure 8 is a side elevational view of the wheel shown in Figure 6.

Figure 9 is a schematic view illustrating the pendulum arrangement of the banking control mechanism.

Referring to Figures 1 and 2, the automobile includes a body 10 carried by a chassis 11 which is supported by a front steerable wheel 12, a rear steerable wheel 13 and respective opposite center drive wheels 14. The front and rear wheels 12 and 13 and the respective driving wheels 14 are disposed in a diamond-shape arrangement which provides for a materially shorter turning radius of the car and at the same time provides improved driving and riding qualities.

In order to take advantage of the above features and at the same time to provide a rugged, shock-resistant frame portion, the chassis 10 comprises a plurality of main frame members 16 and 17 which, as shown, are of cylindrical tubing formed and joined to provide a generally oval shaped contour of the automobile and to provide a generally X-shape internal frame portion. Associated with the opposite main frame members 16 is an internal bracing frame member 17 which has its respective rounded end portions forming the end portions of the chassis and to which the two opposite side frame members 16 are connected as by welding. From the rounded end portions thereof the internal frame member 17 has its respective side portions converging from each end toward the center of the vehicle to be disposed in generally X-shaped relation with respect to the side frame members 16. It will be understood, of course, that box tubing may be used also for the various frame sections. If desired, the side frame members 16 may be extended around the end portions of the chassis with the respective sides of the internal frame member 17 welded thereto at the ends. Alternatively, both the members 16 and 17 can be continuous with their end portions in vertical overlapping relation.

The frame also includes a series of transverse frame members 18, 19, 20 and 21, and these various cross frame members are preferably connected to the frame members 16 and 17 by welding. The cross frame member 20, as seen in Figure 2, is composed of two diagonally disposed end portions providing diagonal bracing adjacent the center of the chassis. Additional diagonal bracing is provided between the frame member 21 and 17 by the diagonal bracing tubes 22.

In order to provide protection for the respective front and rear steering wheels 12 and 13, as well as providing additional frame rigidity and shock-resistance, an upright arcuate transverse frame member 23 is provided at each end extending between the respective side portions of the frame member 17. At its center each arcuate frame member 23 is connected by a longitudinally extending arcuate frame member 24 to the adjacent end portions respectively of the external frame member. It will be seen that the frame construction at the front and rear ends of the chassis provides a rigidity in the frame structure enclosing the respective steering wheels to absorb shocks and prevent possible injury to the steering mechanism. The frame members 23 and 24 in the front and rear ends are preferably connected by an overhead bridge in the form of a tubular framework to support the top of an automobile.

Referring to Figures 2 and 6 through 8, the respective steering wheels 12 and 13 are similar, and are similarly mounted, so that only one will be described in detail. The wheel 12 includes a hub 31 which is journalled by respective bearings 32 and 33 about the wheel spindle 34. The wheel spindle 34 is provided with opposite apertures to receive bushings 36 for the kingpin 37 which extends through an inclined aperture in the axle member 38, and is secured therein by a transverse pin or key 39. A lower thrust bearing 41 is interposed between the spindle member 34 and the axle 38. The appropriate degree of kingpin inclination for caster is indicated by the dot-dash lines in Figure 8, and it will be noted that the kingpin has no inclination transversely of the vehicle.

The front wheel 12 and its axle member 38 are independently sprung, as shown in Figures 6 and 7, by means including a somewhat cylindrical housing 46 which is connected to and supported on a tubular frame member 47 of the chassis. The housing 46 contains a support spring 48 which extends between a mounting plate 49 at the top of the housing 46 and a plate-like extension 51 of the axle member 38. A conventional form of double action telescoping-type shock absorber 50 within the spring 48 is carried at the top by the mounting plate 49 and is connected at the bottom to the plate-like extension 51 of the axle member 38. The axle member 38 is provided with an arcuate upright end portion 52 which is slidably related to the housing 46 by a straight line ball bearing assembly 53 having respective sides of the end portion 52 of the axle member.

To effect simultaneous, reverse steering movement of the front and rear wheels, each of the spindle members 34 (Figure 6) is provided with an apertured boss 56 in which the associated steering control arm 57 (Figure 2) is mounted. As seen in Figure 2, the steering mechanism including the wheel 58 is connected to the steering control arm 57 of the front steering wheel, and this steering control arm is in turn connected by an arm 59, a link 61, a motion reversing lever 62, and a link 63 with the corresponding arm 59 of the rear wheel 13. The net result of the above linkage is that if the front wheel 12 is turned counterclockwise, as viewed in Figure 2, the rear wheel 13 is turned clockwise an equal amount.

The drive means for the automobile may include any desired type of engine, and as illustrated a suitable form of rotary radial cylinder engine 66 is provided which may be connected through a suitable transmission 67 to a differential 68. The differential may be suitably supported on a pair of longitudinal frame members 71 extending in parallel spaced apart relation between the transverse brace 19 and the transverse V-shaped brace 20.

In accordance with the instant invention, the drive wheel arrangement includes opposite independently sprung driving wheels, and the drive arrangement is preferably provided with a controlled pivoting movement with respect to the chassis. Each of the drive wheels 14 (Figures 2 to 5) has its axle member 71a pivotally connected at 72 to the respective ends of a pair of parallel cantilever spring members 73. Also, each of the axle members 71a is pivotally connected at 74 to parallel cross-braced radius arms 76 which extend inwardly and have pivotal support on the respective longitudinal frame members 71. Each of the respective cantilever springs 73 is clamped at the center by a conventional U-clamp 81 to one end of a pivot shaft 82 journalled in a sleeve 80. The sleeve 80 is carried by similar sets of arched frame members 83 welded between the sleeve 80 and the respective side portions of the X-frame member 17. In this way the wheel arrangement and the chassis are connected for relative pivotal movement about the axis of the shaft 82.

From the differential assembly 68 respective drive connections extend to the wheels 14, each including a telescoping shaft 84 connected by respective universal connections 86 at its ends to the differential assembly and to the drive spindle of the wheels 14.

If desired, suitable conventional shock absorbers may be mounted between each of the wheels 14 and the chassis.

In order to control relative pivotal movement between the drive wheel arrangement and the chassis, for example, in preventing excessive tilting on turns and in driving on a side hill, the pivot shaft 82 (Figures 4 and 5) carries a transverse pivot control bar 87 which is connected at its ends by respective conventional pneumatic cylinders 88 with the adjacent side portions of the X-shaped frame member 17. Each of the pneumatic cylinders 88 comprises an upper chamber portion 88a whose lower wall is defined by a flexible steel diaphragm 88b which is connected by the rod 89 with the frame member 17. The upper part of the pneumatic cylinder assembly 88 carries a rod 91 which is pivotally connected with one end of the bar 87.

From the above description it will be seen that relative pivoting movement between the drive wheel arrangement and the chassis about the axis of the shaft 82 can be controlled by the pressure within the opposed pneumatic cylinders 88. These pneumatic cylinders are connected (Figure 9) by respective conduits 92 to the cover of a double valve 94 illustrated schematically in Figure 9. The valve 94 is of a conventional construction including a valve body and a cover mounted for relative pivoting movement with respect to each other. Also connected to the cover of the valve are a conduit 93 which is open to atmosphere and a conduit 95 which is connected to a source of vacuum such as the intake manifold of the engine. The valve body is provided with respective annular recesses or chambers 94a and 94b separated by respective solid wall portions of the valve body. As seen in Figure 9, the conduits 92 from the pneumatic cylinder 88 are normally in registry with the solid wall portions of the valve body and are out of communication with the chambers 94a and 94b, Also the chamber 94a of the valve body is connected through the conduit 95 with the source of vacuum while the chamber 94b is connected by the conduit 93 to the atmosphere, so that a pressure differential may be provided by selective connection of the pressure chambers 88 to the valve chambers 94a and 94b.

The valve body is carried by a shaft 97 which is mounted for pivotal movement on the chassis of the automobile in any conventional manner on a longitudinal axis of the chassis and the valve body has depending therefrom a pendulum 96 including an adjustable counterweight.

With the cover of the valve supported on the chassis and the valve body and the pendulum 96 free to pivot with respect to the cover and the supporting shaft 97, the pendulum 96 is free to move toward one side or the other in response to centrifugal force as a result of turning of the automobile, or in response to driving on the side slant of a crowned road. The resultant pivoting of the valve body 94 on the shaft 97 and with respect to its cover causes the vacuum chamber 94a to register with one of the banking control cylinders through one of the conduits 92, while the atmospheric pressure chamber 94b will register with the opposite banking control cylinder 88. The adjustable pendulum weight 96 is provided to select the proper sensitivity in the valve control with respect to the weight of the vehicle and to provide the desired operating characteristics.

From the above description it will be seen that the two conduits 92 to the respective banking control cylinders 88 are normally closed, and, upon relative turning of the valve 94 in one direction, one of the pneumatic cylinders will be connected to atmospheric pressure while the other will be connected to a source of vacuum. The arrangement is such that upon turning of the automobile, for example, the portions of the cantilever springs 73 which extend toward the outside of the turn will have their associated pneumatic cylinder 88 connected to atmospheric pressure while the opposite cylinder 88 will be connected to vacuum. This tilts the bar 87 and, correspondingly, places a tilting force on the springs 73 which strengthens the spring portion which resists the tendency of the chassis to roll on the turn, and provides an automatic banking of the chassis by the weakening of the other end portions of the springs which are associated with the pneumatic cylinder 88 to which vacuum is applied. In the same manner, when driving on a slanting roadway, the lowermost spring ends are strengthened and the uppermost spring ends are relatively weakened to again effect an automatic banking.

While I have shown and described certain preferred embodiments of the invention, it is apparent that the invention is capable of variation and modification from the forms shown so that its scope should be limited only by the scope of the claims appended hereto.

I claim:

1. In an automobile having a chassis and drive means thereon, opposite drive wheels, a transverse spring structure connecting said drive wheels and having a pivotal connection to the chassis about a longitudinal axis, a link connection from each of said drive wheels to the chassis extending generally parallel to the adjacent portion of the spring structure, respective drive connections extending between the drive means and each drive wheel, and means for varying the effective tension of said spring structure to control relative pivotal movement between the chassis and the spring structure about said longitudinal axis, said tension varying means including a pair of opposed pneumatic cylinders at opposite sides of said pivotal connection and each connected between the chassis and the spring structure.

2. In an automobile having a chassis and drive means thereon, opposite drive wheels, a transverse spring structure connecting said drive wheels and having a pivotal connection to the chassis about a longitudinal axis, a link connection from each of said drive wheels to the chassis extending generally parallel to the adjacent portion of the spring structure, respective drive connections extending between the drive means and each drive wheel, means for varying the effective tension of said spring structure to control relative pivotal movement between the chassis and the spring structure about said longitudinal axis, said tension varying means including a pair of opposed pneumatic cylinders at opposite sides of said pivotal connection and each connected between the chassis and the spring structure, a valve for controlling the pressure in said cylinders, and a pendulum device for controlling said valve.

3. In an automobile having a chassis and drive means thereon, opposite drive wheels, a transverse spring structure connecting said drive wheels and having a pivotal connection to the chassis about a longitudinal axis, a link connection from each of said drive wheels to the chassis extending generally parallel to the adjacent portion of the spring structure, respective drive connections extending between the drive means and each drive wheel, means for varying the effective tension of said spring structure to control relative pivotal movement between the chassis and the spring structure about said longitudinal axis, said tension varying means including a pair of opposed pneumatic cylinders at opposite sides of said pivotal connection and each connected between the chassis and the spring structure, a source of pressure, a valve for controlling the pressure in said cylinders by selective connection thereof to said source of pressure, and a pendulum device for controlling said valve.

HARVEY GORDON HANSEN.

REFERENCES CITED

The following references are of record in the file of this patent:

UNITED STATES PATENTS

| Number | Name | Date |
|---|---|---|
| 1,599,614 | Frederickson | Sept. 14, 1926 |
| 1,789,242 | Marsh | Jan. 13, 1931 |
| 1,790,640 | Cappa | Feb. 3, 1931 |
| 2,019,725 | Peo | Nov. 5, 1935 |
| 2,076,722 | Heinze | Apr. 13, 1937 |
| 2,173,525 | Wallace | Sept. 19, 1939 |
| 2,214,293 | D'Aubarede | Sept. 10, 1940 |
| 2,309,811 | Utz | Feb. 2, 1943 |
| 2,314,603 | Sorensen et al. | Mar. 23, 1943 |
| 2,328,740 | Reimspiess | Sept. 7, 1943 |
| 2,353,503 | Rost et al. | July 11, 1944 |
| 2,354,700 | Pezzano | Aug. 1, 1944 |
| 2,420,462 | Carr | May 13, 1947 |

FOREIGN PATENTS

| Number | Country | Date |
|---|---|---|
| 414,882 | Great Britain | Aug. 16, 1934 |
| 780,867 | France | Feb. 11, 1935 |